Figure 1:
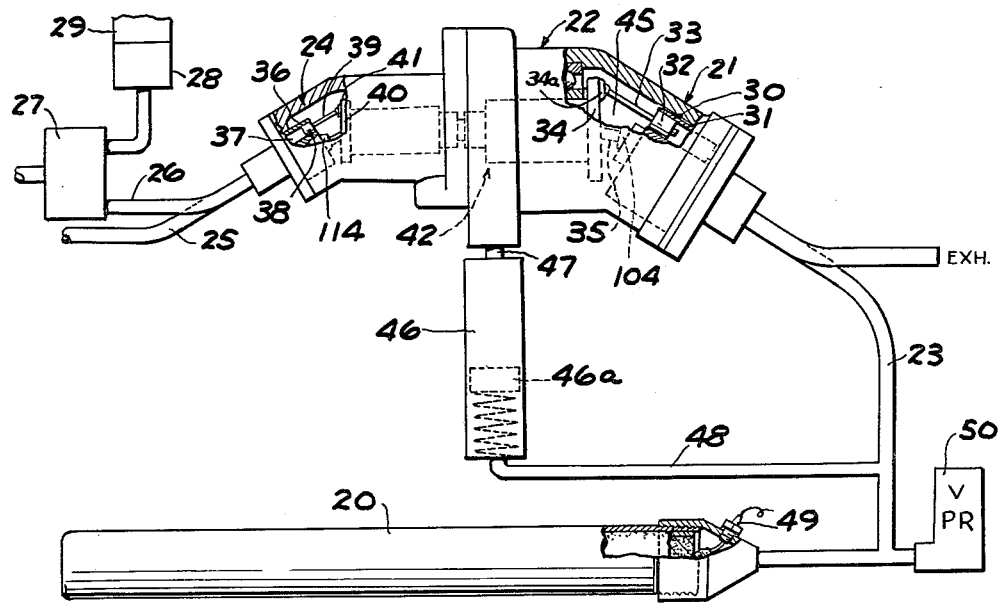

July 31, 1962  B. W. BADENOCH ETAL  3,046,898
POWER TRANSMISSION
Filed June 10, 1959  4 Sheets-Sheet 1

INVENTORS
BENJAMIN W. BADENOCH
& ROBERT M. STEWART
BY
Barnes, Kisselle, Raisch & Choate
ATTORNEYS

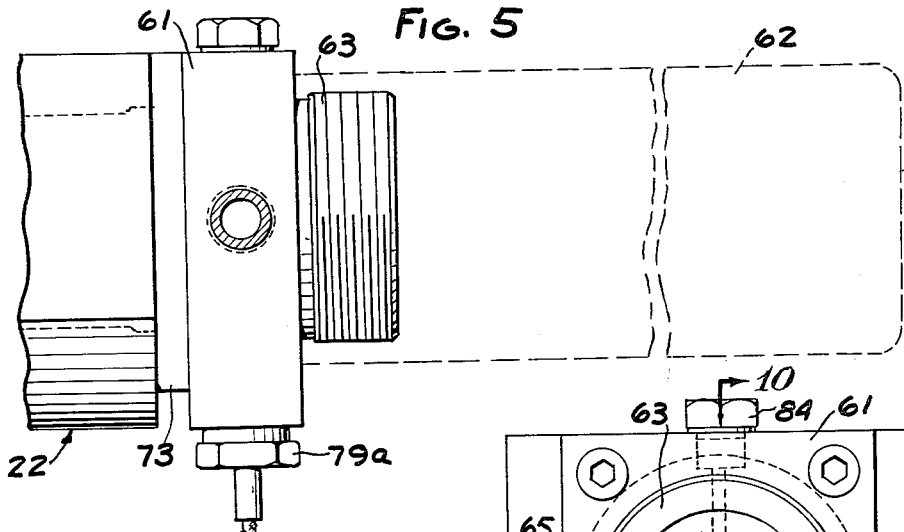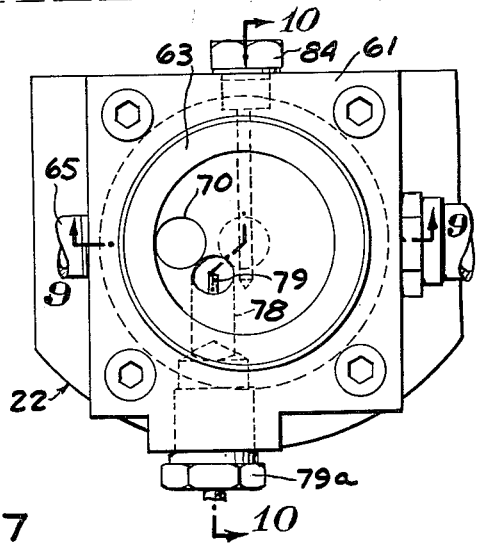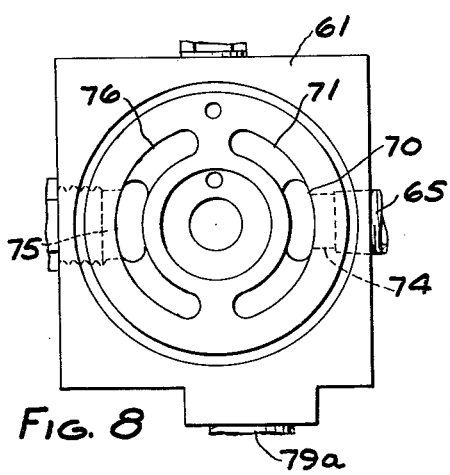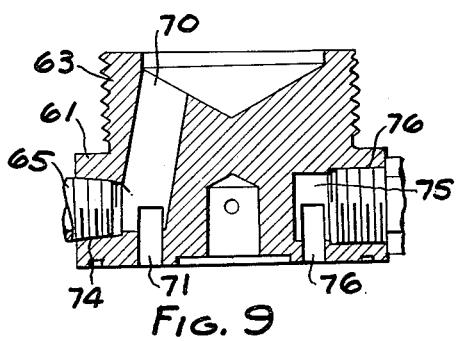
INVENTORS
BENJAMIN W. BADENOCH
& ROBERT M. STEWART
ATTORNEYS July 31, 1962 B. W. BADENOCH ETAL 3,046,898
POWER TRANSMISSION
Filed June 10, 1959 4 Sheets-Sheet 4

INVENTORS
BENJAMIN W. BADENOCH
& ROBERT M. STEWART
BY
Barnes, Kisselle, Raisch & Choate
ATTORNEYS 3,046,898
POWER TRANSMISSION
Benjamin W. Badenoch, Birmingham, and Robert M. Stewart, Detroit, Mich., assignors to Vickers Incorporated, Detroit, Mich., a corporation of Michigan
Filed June 10, 1959, Ser. No. 819,299
6 Claims. (Cl. 103—49)

This invention relates to power transmissions and particularly to secondary power systems, operable independently of the primary propelling power systems, for operating components of missiles, rockets and the like which may require high force.

In secondary power systems for the components of missiles, rockets and the like, it is necessary that the source of power not rely on oxygen from the external atmosphere. Accordingly, liquid or solid propellants which contain their own oxygen forming materials must be used. The use of such propellants presents certain serious problems. First, any leakage of hot gases, resulting from combustion of the propellants, past clearance spaces results in a rapid heating of the adjacent parts. Second, the hot gases produced by the propellants contain solid particles which are highly erosive and damaging to metal parts. Third, the hot gases produced by the propellants have no lubricating action and therefore a sliding fit between metal surfaces must be avoided or sufficient lubrication must be provided. Fourth, the temperature of the hot gases is quite high necessitating the use of materials which will withstand the high temperatures or, alternatively, proper cooling must be provided.

In addition to overcoming the above problems, it is desirable that the secondary power system be light in weight because of its intended use in rockets and missiles.

It is a major object of this invention to provide a power system utilizing hot gases to produce a propelling force.

It is an object of this invention to provide such a secondary power system which is reliable.

It is a further object of the invention to provide such a system which is capable of producing a relatively low speed high torque for driving the components utilizing the hot gases generated by liquid or solid propellant gas generators.

It is a further object of the invention to provide units in such a system which have long life and are rugged to withstand the stresses produced by the hot gases, yet are light in weight.

According to the invention, hot gases resulting from the combustion of solid propellants are directed to the inlet of an axial piston type motor and hydraulic liquid is supplied to the ends of the pistons remote from the inlet at a pressure equal to the inlet pressure of the hot gases; the differential pressure between the ends of the pistons when they are adjacent the exhaust causes the motor to operate in response to tension produced in the connecting rods, rather than a compressive force as in conventional axial piston type motors.

Figure 2:
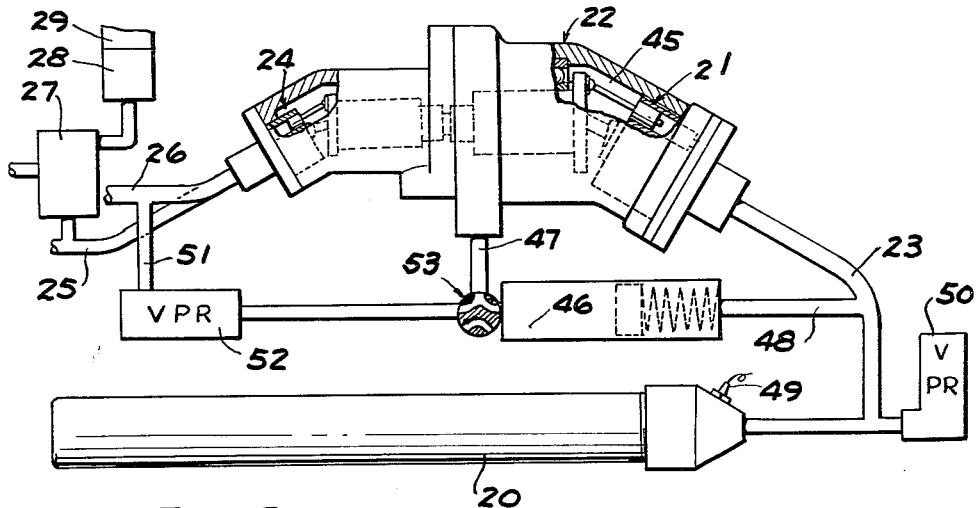
Figure 3:
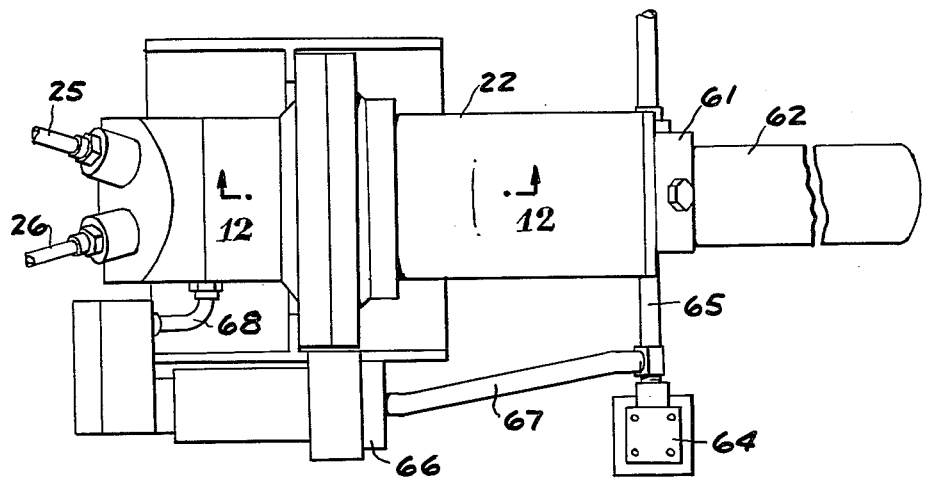
Figure 4:
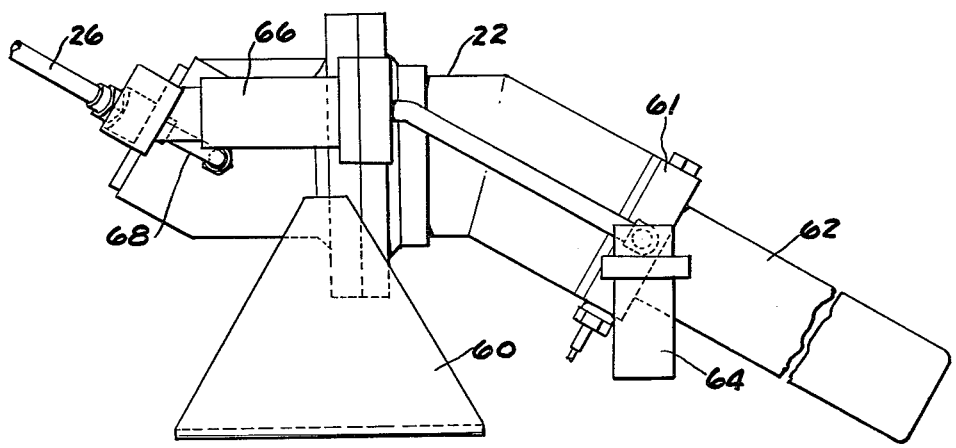
Figure 10:
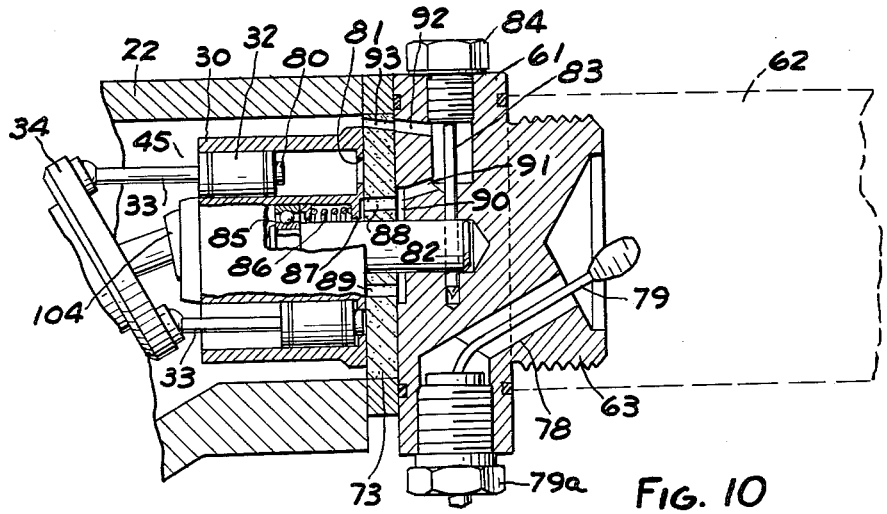
Figure 12:
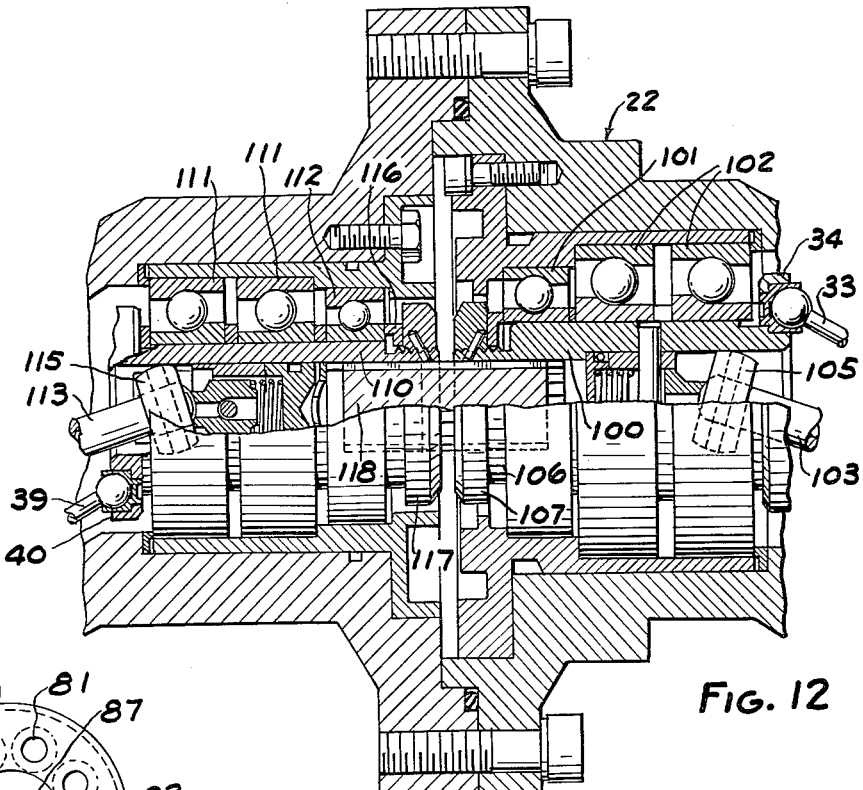
Figure 11:
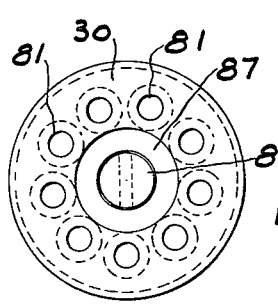

In the drawings:
FIG. 1 is a part sectional, partly diagrammatic view of a secondary power system embodying the invention.
FIG. 2 is a part sectional, partly diagrammatic view of a modified form of secondary power system embodying the invention.
FIG. 3 is a plan view of the elements of the secondary power system shown in FIG. 1 as adapted in a unitary assembly for mounting in a missile or the like.
FIG. 4 is an elevation of the apparatus shown in FIG. 3.
FIG. 5 is a fragmentary part sectional view of the right hand portion of the apparatus shown in FIG. 4, with the solid propellent casing shown in dotted lines and the pressure relief valve removed.
FIG. 6 is a right hand end view of the apparatus shown in FIG. 5 showing details of the valve block.
FIG. 7 is a right hand end view of the apparatus shown in FIG. 5 with the valve block removed.
FIG. 8 is an end view of the valve block from the side opposite that shown in FIG. 6.
FIG. 9 is a sectional view of the valve block taken along the line 9—9 in FIG. 6.
FIG. 10 is a sectional view taken along the line 10—10 in FIG. 6 showing details of the valve block and motor.
FIG. 11 is a right hand end view of the apparatus shown in FIG. 10 with the valve block and valve plate removed.
FIG. 12 is a fragmentary sectional view of the apparatus taken along the line 12—12 in FIG. 3.

Referring to FIG. 1, the secondary power system comprises a hot gas generator 20, such as a casing containing solid propellants, for supplying hot gases to a pressure energy translating device such as an axial piston type motor 21 mounted in one end of a housing 22. A conduit 23 extends from the hot gas generator 20 to the inlet of motor 21. Motor 21 is connected to an axial piston type pump 24 on the other end of housing 22 so that when the motor 21 is operated by the hot gases, as presently described, pump 24 is caused to pump hydraulic fluid in pipe 25 and out pipe 26. Pipe 26 may be connected to a suitable servo mechanism 27, controlled by radio or some other means, which in turn controls the flow of hydraulic fluid to the operating motor 28 for the component 29 of the rocket, missile or the like.

Motor 21 is of generally the same construction as the well-known axial piston type hydraulic fluid motors, except for certain structural details hereinafter described. Motor 21 comprises a cylinder block 30 rotatably mounted in the end of housing 22. Block 30 includes a plurality of circumferentially spaced axially extending cylinders 31 in which pistons 32 are mounted for reciprocating movement. Pistons 32 carry rods 33 which are connected to a flange 34 by ball joints 34a. A double Cardan type universal joint 35 extends between the flange 34 and the cylinder body 30 to synchronize the movement of the body 30 and flange 34.

The hydraulic pump 24 is of conventional construction and comprises a cylinder body 36 rotatably mounted in the other end of the housing 22 and having a plurality of circumferentially spaced axially extending cylinders 37 formed therein in which pistons 38 are mounted for reciprocating movement. Pistons 38 carry rods 39 which are connected to a flange 40 by ball joints 41. A driving connection 42 connects the flange 34 of the motor 21 with the flange 40 of the pump 24. Thus, when the flange 34 is rotated by operation of motor 21, it, in turn, rotates the flange 40 causing the pistons 38 of pump 24 to reciprocate in the cylinder body 36 and thereby pump hydraulic fluid.

According to the invention, the housing 22 provides a chamber 45 between the motor 21 and the pump 24, which chamber communicates with the ends of the cylinders 31, 37 which are remote from the ends of the housing 22, that is, remote from the inlet and exhaust ends of the pistons in motor 21 and pump 24. An incompressible hydraulic fluid such as oil is provided to the chamber 45 at a pressure at least equal to but preferably greater than the pressure of the hot gases supplied to the inlet of the motor 21.

As shown in FIG. 1, an accumulator 46 of conventional type having a pressure responsive member 46a dividing it into two sides is provided in the system. One side of accumulator 46 is in communication with the chamber 45 by means of pipe 47 and the other side of accumulator 46 is connected to the inlet pipe 23 by pipe 48. A variable pressure relief valve 50 is provided in conduit 23 to serve as a means for controlling the pressure from the hot gas generator 20.

In operation, when the solid propellant in the generator 20 is ignited by igniter 49, the hot gases which are generated pass to the inlet of the motor 21 through conduit 23. At the same time, the pressure of these gases is applied to the hydraulic fluid in chamber 45 through accumulator 46. As a result, the pressures on the opposite ends of the pistons 32 which are adjacent the inlet of the motor 21 are substantially equal so that there is no driving force on the pistons, the inlet thus acting as a balancing port; while the pistons 32 which are adjacent the exhaust or outlet have atmospheric pressure on their outer ends and hydraulic fluid pressure equal to the inlet pressure of the hot gases on their inner ends and are driven outwardly rotating the flange plate 34, the outlet thus acting as a working port.

The provision of hydraulic fluid in chamber 45 at a pressure at least equal to the pressure of hot gases entering the motor 21 insures that the hot gases will not leak past the pistons 32 into the chamber 45 or across the running clearance between cylinder barrel 30 and the valve plate. Accordingly, any solid particles carried by the hot gases will not pass or be lodged between the pistons 32 or score the mating surfaces of the valve plate and cylinder barrel and the walls of the cylinders 31. In addition, the hydraulic fluid contacts the surfaces of the cylinders 31 when the pistons 32 are adjacent the gas outlet to provide some lubrication for the pistons 32 and cylinders 31 and the balancing surfaces. The presence of hydraulic fluid in chamber 45 also provides a cooling action on the various parts.

In the system shown in FIG. 2, an additional conduit 51 is provided between the outlet 26 of pump 24 and the chamber 45 and a pressure regulator 52 is provided in the conduit 51. A three-way valve 53 is provided at the juncture of the accumulator 46, conduit 51 and pipe 47. In the position shown, valve 53 permits communication between accumulator 46 and pipe 47 and also between conduit 51 and pipe 47.

In this system, the initial pressure in chamber 45 is provided by the initial pressure in accumulator 46. When the motor 21 is starting up, the pressure of accumulator may be adjusted so that there is very little resistance to the rotation of the motor 21. However, when motor 21 starts rotating and driving the pump 24, the fluid pressure from the pump 24 applied to the chamber 45 through conduit 51 increases the pressure in chamber 45. By this arrangement, the pressure in chamber 45 may be increased substantially above the inlet pressure of the hot gases. This arrangement is preferred not only to prevent leakage of hot gases inwardly but also to provide for better lubrication between pistons 32 and cylinders 31 by forced flow of hydraulic fluid outwardly between the pistons 32 and cylinders 31, and also across the valving surface. Valve 53 may also be positioned so as to provide communication only between accumulator 46 and pipe 47, in which case the system operates in a manner similar to that shown in FIG. 1.

Valve 53 may also be rotated to provide communication between conduit 51 and pipe 47 only. Under such a setting of valve 53, there is little if any pressure in chamber 45 until the pump 24 begins to rotate and provides a pressure through conduit 51 and pipe 47 to chamber 45. This would occur for a short interval of time, but in certain applications, might not cause any detrimental effects on the motor 21.

Valve block 61 for directing the flow of hot gases to the motor and exhaust gases from the motor is mounted on the motor end of the housing 22 and a casing 62 containing a solid propellant is threaded on an extension 63 (FIG. 5) of the valve block 61. A pressure relief valve 64 communicates with an opening in the valve block 61 through pipe 65. An accumulator 66 is mounted on the side of housing 22. One side of accumulator 66 is connected to the pipe 65 by a pipe 67. A conduit 68 connects the other side of accumulator to the housing 22 (FIG. 3).

As shown in FIGS. 6, 8 and 9, valve block 61 includes a passageway 70 which extends from the end of extension 63 to an arcuate inlet passage 71. Inlet passage 71 registers with an arcuate inlet opening 72 in a valve plate 73 (FIG. 7). Valve block 61 also includes a radial passage 74 into which the pipe 65 from pressure relief valve 64 extends.

As further shown in FIG. 9, valve block 61 includes a radially extending exhaust opening 75 communicating with an arcuate outlet or exhaust passage 76. Exhaust passage 76 registers with arcuate outlet or exhaust opening 77 in the valve plate 73 (FIG. 7).

Valve plate 73 includes an insert 78 which is preferably made of high temperature corrosion resistant material such as carbon. The valve plate 73 may be made of a high temperature corrosion resistant material.

As shown in FIGS. 6 and 10, valve block 61 also supports igniter 79 and includes a radially and axially extending opening 78. Igniter 79 is fixed on a plug 79a threaded into opening 78. The opening 78 communicates with the end of extension 63 and igniter 79 extends through passage 78 to the end of the extension 63 adjacent the propellant in casing 62.

As shown in FIGS. 10 and 11, pistons 32 have their outer ends formed with a portion 80 of reduced diameter which is adapted to extend into a complementary portion 81 on the outer end of the cylinder block when the pistons are at the outer end of their strokes. This provides a smaller clearance space and a more efficient operation.

Referring to FIG. 7, the angular extent of the inlet 72 in the valve plate 73 is made smaller than if the motor were made for operation by hydraulic fluid in order to permit an adiabatic expansion of the hot gases in the cylinders and thereby obtain a more efficient operation.

As shown in FIG. 10, cylinder block 30 is journalled in the end of housing 22 on a stub shaft 82 which is held in the valve block 61 by a radially extending pin 83 fixed to a plug 84 and extending through an opening in one end of shaft 82. A ball bearing 85 is mounted on the other end of shaft 82 between the block 30 and the shaft. A spring 86 operating between the outer race of bearing 85 and a flange 87 on the cylinder body 30 yieldingly urges the cylinder body against valve plate 73 to provide a pressure seal.

As further shown in FIG. 10, hydraulic fluid may flow from chamber 45 through openings 88, 89 in the valve plate 73 to a chamber 90 in valve block 61 and thereafter through passageways 91, 92 and opening 93 to the chamber 45 thereby facilitating the cooling of the valve block 61.

Since the motor 21 is rotated by the differential pressure between the hydraulic pressure in chamber 45 and pressure at outlet or exhaust, the stress on the piston rods 33 is such that the rods are in tension. As a result, the thrust loads are reversed from an axial piston type motor of conventional construction. Accordingly, it is necessary to analyze the stresses and provide the proper type of bearing arrangement for absorbing the thrust.

In the arrangement shown and referring particularly to FIG. 12, flange 34 of the motor 21 is an integral part of a hollow shaft 100 which is rotatably mounted in housing 22 by ball type thrust bearings 101, 102. The driving connection 35 between the hollow shaft 100 and the cylinder block 30 comprises a link 103 which is connected to the cylinder body 30 at one end by universal joint 104 and is connected to the hollow shaft 100 at its other end by a universal joint 105. A spacer 106 is positioned on the end of hollow shaft 100 remote from the cylinder block 30 and engages the inner race of bearing 101 and a nut 107 is threaded on the end of the hollow shaft 100 and bears against spacer 106.

Flange 40 of the pump is formed integrally with a hollow shaft 110 which is rotatably mounted in housing 22 by bearings 111, 112. The driving connection between cylinder body 36 and flange 40 also includes a link 113 connected at one end to the cylinder body 36 of the pump by a universal connection 114 and connected at the other end to the hollow shaft 110 by universal joint 115. A spacer 116 is provided on the other end of hollow shaft 110 and engages the inner race of bearing 112. A nut 117 is threaded on the end of the hollow shaft and bears against the spacer 116. Finally, a splined shaft 118 interconnects the hollow shafts 100, 110 to provide a driving connection between the hollow shafts.

In the arrangement shown, the thrust loads are substantially balanced. It should, of course, be understood that depending on the design, pressures and angular relationship of the motor and pump axes, there may be a net thrust in which case the thrust bearings must be properly positioned to tranfer this thrust to the housing 22.

The operation of the apparatus shown in FIGS. 3–12 may be summarized as follows:

When the igniter 79 is energized, the solid propellant in casing 62 begins to burn creating hot gases which pass through passageway 70 of valve block 61 to inlet passage 71 and then to inlet opening 72 in valve plate 73. The pressure of the gases is provided to one side of accumulator 66 which in turn applied pressure to the hydraulic fluid in chamber 45. Since the hydraulic liquid pressure on the inner ends of the pistons 32 which are adjacent the inlet opening 72 in valve plate 73 is substantially equal to the pressure of the hot gases on the outer ends of the pistons adjacent the inlet opening 72, the pressures on these pistons are balanced. However, the pressures on the ends of the pistons 32 adjacent the outlet opening 77 in valve plate 73 are unbalanced because the inner ends of these pistons have hydraulic fluid pressure applied thereto and the outer ends are at exhaust or atmospheric pressure. As a result, the motor will be operated due to the differential pressure on the pistons which are adjacent the exhaust; the motor operating as a result of tension in the connecting rods rather than compression as in prior art devices. As the cylinder body rotates, successive cylinders 31 are brought into register with the inlet opening 72 and outlet opening 77. Thus, in the operation of the motor, the inlet openings and passages function as balancing ports and the outlet openings and passages function as operating ports.

In operation, the pressure of hydraulic fluid in chamber 45 functions to cool the cylinder body 30 and valve plate 73. In addition, the hydraulic fluid present in valve block 61 also serves to cool the valve block.

It can thus be seen that there has been provided a secondary power system for moving an element of a rocket, missile or the like at a low speed and with a high torque. The system utilizes hot gases from propellants to provide the power. By applying pressure on the ends of the pistons remote from the inlet and outlet of the hot gases, the leakage of hot gases through the clearance spaces is eliminated thereby eliminating the rapid heating of the parts of the motor. The passage or lodging of solid erosive particles between the mating surfaces of the pistons and cylinders and the mating valving surfaces is also eliminated. At the same time, the hydraulic fluid provides a lubricating action between the surfaces of the pistons and the cylinders. The presence of the hydraulic fluid also serves to cool the various parts of the apparatus.

The structure used in the power system is relatively light in weight and is sufficiently rugged to withstand the stresses produced by the hot gases so that a long life results.

We claim:

1. A secondary power system for missiles and the like comprising a component movably mounted on a missile, a hot gas generator carried by said missile, a rotary fluid pressure energy translating device mounted on said missile, said device being of the type having a drive member which is adapted to be operatively connected to said component, a plurality of axially positioned cylinders, pistons reciprocable in said cylinders, and motion converting means for converting the reciprocating motion of the pistons to rotation of said drive member, said device having an inlet and an outlet successively communicating with one of the ends of each said cylinder, means for connecting said inlet to said hot gas generator, means defining a chamber adjacent the other ends of said cylinders, and an accumulator having a pressure responsive member therein and fluid connections on each side of said member, means connecting one side of said accumulator to said chamber and means connecting the other side of said accumulator to the means for connecting said hot gas generator to the inlet of said pressure energy translating device for applying a pressure to hydraulic fluid in said chamber substantially equal to the pressure of said hot gases provided to said inlet of said hot gas generator substantially immediately when said hot gas generator is energized.

2. A power transmission comprising a solid propellent type hot gas generator adapted to be carried by a missile, a rotary fluid pressure energy translating device mounted on said missile, said device being of the type having a drive member, a plurality of axially positioned cylinders, pistons reciprocable in said cylinders and motion converting means for converting the reciprocating movement of said pistons to rotation of said drive member, said device having an inlet and an outlet communicating successively with one of the ends of each said cylinder, conduit means for connecting said inlet to said hot gas generator, and a rotary fluid pump of the type having an input member, a plurality of axially positioned cylinders, pistons reciprocable in said last mentioned cylinders and motion converting means for converting the rotating movement of said pump input member to reciprocating motion of said pistons of said pump, means forming a driving connection between the drive member of said pressure energy translating device and the input member of said pump, means defining a chamber between the other ends of said cylinders of said pressure energy translating device and the adjacent ends of said cylinders of said pump, and an accumulator having a pressure responsive member therein and fluid connections on each side of said member, first conduit means extending between one side of said member and said chamber and second conduit means extending between the other side of said member and the conduit means which connects the hot gas generator to the inlet of said pressure energy translating device for applying a pressure to hydraulic fluid in said chamber substantially equal to the pressure of said hot gases provided to said inlet of said hot gas generator substantially immediately when said hot gas generator is energized.

3. A power transmission system comprising a solid propellent type hot gas generator, and means for converting the pressure of said hot gases to a hydraulic fluid pressure comprising a housing having a rotary fluid pressure energy translating device at one end thereof of the type having a drive member, a cylinder block rotatably mounted in said housing and having a plurality of axially positioned cylinders, pistons reciprocable in said cylinders, and motion converting means for converting the reciprocating motion of the pistons to rotation of said drive member, said housing a gas inlet providing communication between said hot gas generator and the outer ends of said cylinders and an exhaust gas outlet for exhausting the hot gases from the outer ends of said cylinders, and a rotary fluid pump at the other end of said housing of the type having an input member, a cylinder block rotatably mounted in the housing, said last mentioned block having a plurality of axially positioned cylinders, pistons reciprocable in said last mentioned cylinders, motion converting means for converting the rotational movement of said pump input member to reciprocating motion of the pistons of said pump, means forming a driving connection between the drive member of said pressure energy translating device and the input member of said pump, said housing defining a chamber communicating with the inner ends of said cylinders of said pressure energy translating device and said pump, and an accumulator having a pressure responsive member, conduit means extending between one side of said accumulator and said chamber and conduit means extending between the other side of said accumulator and said conduit means which connects said hot gas generator to the inlet of said pressure energy translating device for applying a pressure to hydraulic fluid in said chamber substantially equal to the pressure of said hot gases provided to said inlet of said hot gas generator substantially immediately when said hot gas generator is energized.

4. A secondary power system for missiles and the like comprising a hot gas generator carried by a missile, a rotary fluid pressure energy translating device mounted on said missile, said device being of the type having a drive member which is adapted to be operatively connected to a missile component, a plurality of cylinders, pistons reciprocable in said cylinders, and motion converting means for converting the reciprocating motion of the pistons to rotation of said drive member, said device having an inlet and an outlet communicating successively with one of the ends of each said cylinder, means for connecting said inlet to said hot gas generator, means defining a chamber adjacent the other ends of said cylinders, and an accumulator having a pressure responsive member therein and fluid connections on each side of said member, means connecting one side of said accumulator to said chamber and means connecting the other side of said accumulator to the means for connecting said hot gas generator to the inlet of said pressure energy translating device for applying a pressure to hydraulic fluid in said chamber substantially equal to the pressure of said hot gases provided to said inlet of said hot gas generator substantially immediately when said hot gas generator is energized.

5. A secondary power system for missiles and the like comprising a hot gas generator carried by a missile, a rotary fluid pressure energy translating device mounted on said missile, said device being of the type having a drive member which is adapted to be operatively connected to a missile component, a plurality of cylinders, pistons reciprocable in said cylinders, and motion converting means for converting the reciprocating motion of the pistons to rotation of said drive member, said device having an inlet and an outlet communicating successively with one of the ends of each said cylinder, means for connecting said inlet to said hot gas generator, means defining a chamber adjacent the other ends of said cylinders, and means for applying a pressure to hydraulic fluid in said chamber at least as great as the pressure of the hot gases provided to said inlet from said hot gas generator, said latter means comprising a hydraulic pump, means forming a driving connection between the hydraulic pump and the drive member of the pressure energy translating device, conduit means extending between the outlet of the pump and said chamber, an accumulator having a pressure responsive member therein and fluid connections on each side of said member, first conduit means extending between one side of said member and said chamber and second conduit means extending between the other side of said member and the means for connecting the inlet to the hot gas generator, whereby on initial operation of the power system, pressure substantially equal to the pressure of the hot gases provided to said inlet by said hot gas generator is applied to the liquid in said chamber by said accumulator and subsequently, when the hydraulic pump has begun to operate, pressure at least equal to the pressure of the hot gases provided to said inlet by said hot gas generator is applied to the liquid in said chamber from said hydraulic pump.

6. A power transmission comprising a solid propellant type hot gas generator adapted to be carried by a missile, a rotary fluid pressure energy translating device mounted on said missile, said device being of the type having a drive member, a plurality of axially positioned cylinders, pistons reciprocable in said cylinders and motion converting means for converting the reciprocating movement of said pistons to rotation of said drive member, said device having an inlet and an outlet communicating successively with one of the ends of each said cylinder, conduit means for connecting said inlet to said hot gas generator, and a rotary fluid pump of the type having an input member, a plurality of axially positioned cylinders, pistons reciprocable in said cylinders and motion converting means for converting the rotating movement of said drive member to reciprocating motion of said pistons, means forming a driving connection between the drive member of said pressure energy translating device and the input member of said pump, means defining a chamber between the other ends of said cylinders of said pressure energy translating device and the adjacent ends of said cylinders of said pump, and means responsive to the operation of said system for applying a pressure to hydraulic fluid in said chamber at least as great as the pressure of gas supplied to said inlet of the pressure energy translating device by said hot gas generator, conduit means extending between the outlet of the pump and said chamber, an accumulator having a pressure responsive member therein and fluid connections on each side of said member, first conduit means extending between one side of said member and said chamber and second conduit means extending between the other side of said member and the means for connecting the inlet to the hot gas generator, whereby on initial operation of the power system, pressure substantially equal to the pressure of the hot gases provided to said inlet by said hot gas generator is applied to the liquid in said chamber by said accumulator and subsequently, when the hydraulic pump has begun to operate, pressure at least equal to the pressure of the hot gases provided to said inlet by said hot gas generator is applied to the liquid in said chamber from said hydraulic pump.

References Cited in the file of this patent

UNITED STATES PATENTS

| | | |
|---|---|---|
| 1,817,063 | Carrie et al. | Aug. 4, 1931 |
| 1,996,889 | Thomas | Apr. 9, 1935 |
| 2,353,802 | Zimmermann | July 18, 1944 |
| 2,391,972 | Hufford et al. | Jan. 1, 1946 |
| 2,723,528 | Stark et al. | Nov. 15, 1955 |
| 2,862,449 | Wyland | Dec. 2, 1958 |